Sept. 19, 1967  G. H. STUDTMANN ETAL  3,343,068
STATIC INVERTER SYSTEM
Filed June 4, 1965

INVENTORS
George H. Studtmann
Richard Shemanske

By James J. Jennings, Jr.
Attorney

United States Patent Office 3,343,068
Patented Sept. 19, 1967

3,343,068
STATIC INVERTER SYSTEM
George H. Studtmann, Mount Prospect, and Richard Shemanske, Arlington Heights, Ill., assignors to Borg-Warner Corporation, Chicago, Ill., a corporation of Illinois
Filed June 4, 1965, Ser. No. 461,395
8 Claims. (Cl. 321—45)

The present invention is directed to a static inverter which utilizes semiconductor switches and reactive commutating components, and more particularly to the recovery of energy from the reactive commutating components without passing the returned energy through the semiconductor switches to obviate dissipation of the commutation energy used in heating of the semiconductor switches.

The term "inverter" as used herein and in the appended claims refers to a system for receiving direct-current (D-C) energy over an input circuit, and translating this energy into alternating-current (A-C) energy which is passed over an output circuit. The use of inverter systems has increased since the advent of semiconductor switches such as silicon-controlled rectifiers (SCR's) and the subsequent research work directed to increasing the current-handling capacity of such switches. One known inverter arrangement includes an input circuit comprising two conductors for receiving D-C energy, and a pair of SCR's, one of which is coupled to each of the two input conductors. A reactive commutating means, such as a commutating choke assembly, is coupled between the SCR's for effectively transferring the load current as one of the SCR's is shut off and the other is turned on, for simultaneously applying a hold-off voltage to the portion of the commutating choke assembly coupled to the SCR being shut off, to insure that this SCR is held off for a time period sufficiently long to permit the SCR to recover to the blocking condition. One expeditious way of providing auxiliary energy for rapidly achieving this commutation between the two SCR's is the provision of storage capacitors, one coupled to each portion of the commutating choke assembly, to "dump" energy into such portion of the choke as the associated SCR is gated on and, by auto-transformer action, to establish across the commutating choke assembly a potential which is effective to hold the other SCR off for the requisite time. Unfortunately this energy "dumped" into the commutating choke inadvertently is trapped, and the present invention is directed to the recovery of this trapped energy with minimum recirculation through the semiconductor components.

A problem arises with the rapid dumping of the commutating energy into the associated winding of the choke assembly, for the level of the current flowing in this winding may swiftly reach a peak value of two to three times the normal load current. After the commutating energy has been "dumped" into the commutating choke, the level of current flow reaches a peak value and begins to decrease. In accordance with well known electromagnetic principles, the polarity of the potential appearing across this choke reverses as the level of the current begins to decrease, and the commutating energy stored in the choke assembly commences to be returned to the inverter circuit.

In many earlier inverters, this stored energy is given up by the choke by passing from the commutating choke winding through the SCR just rendered conductive and through a protective or "spillover" diode. Thus the commutating energy is dissipated by recirculation through the just described circuit, principally in heating of the semiconductor units including the SCR and the spillover diode. The manifest disadvantage of this arrangement is that a measure of heating is caused by normal operation of the SCR, and there is only a pre-established level to which the SCR can be heated without serious and permanent damage. The more that this thermal rating of the SCR is allocated to return of the commutating energy, the less of this thermal rating is available to handle the usual heating caused by passage of the load current and thus the lower is the rating of the inverter.

It is therefore a salient consideration of the present invention to provide a novel and unobvious energy return circuit for effectively retrieving the commutating energy in an inverter circuit without passing it through the SCR or through the spillover diode, thereby enhancing the rating of the inverter system.

The present invention finds utility with an inverter system which includes first semiconductor switching means operable between first and second conditions for converting unidirectional energy received over an input circuit to alternating energy for transfer over an output circuit. Means for applying first control signals to the first semiconductor switching means is provided, thus to initiate operation from one to another of such conditions. Also provided is auxiliary means, such as a commutating choke assembly, and energy storage means, such as commutating capacitors, which assist in operation of the first semiconductor switching means between the first and second conditions. In the commutation process energy becomes trapped in the choke assembly, and therefore a return means is provided for recovering the trapped energy and returning this energy to the input circuit. In the energy return process a portion of the trapped energy tends to be dissipated by circulation through at least a portion of the system including the first semiconductor switching means. In accordance with the present invention, second semiconductor switching means is provided and coupled in the energy return means, and means for applying second control signals to the second semiconductor switching means in timed relation with the application of the first control signals to the first semiconductor switching means is also provided. With this arrangement the energy used in commutating is conserved and excessive component heating is obviated.

In order to acquaint those skilled in the art with the best mode contemplated for making and using the invention, a description thereof will be set forth in connection with the accompanying drawing, in the several figures of which like reference numerals identify like elements, and which:

GENERAL SYSTEM DESCRIPTION

Figure 1:
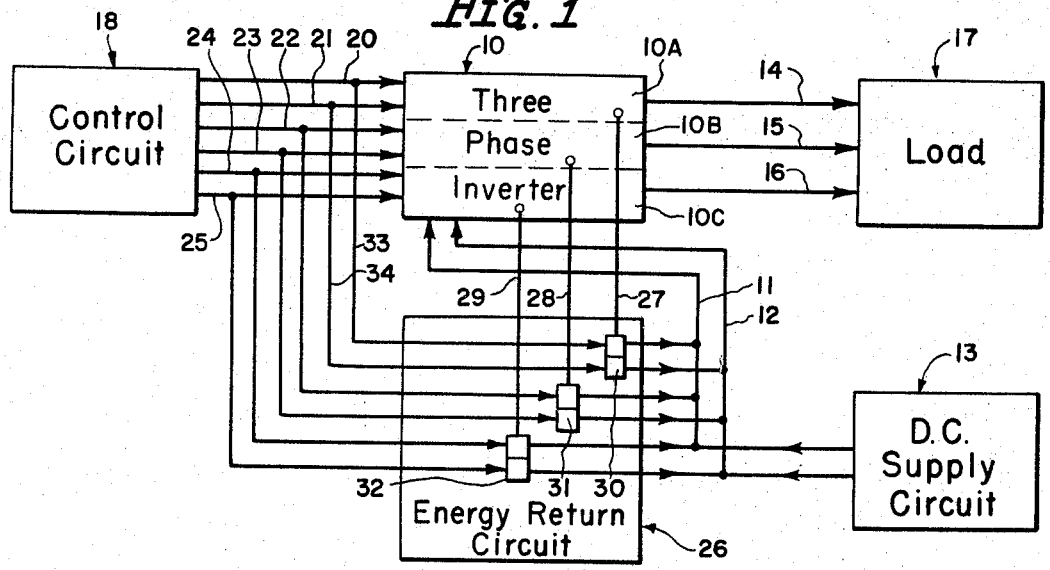
FIGURE 1 is a block diagram depicting the incorporation of the present invention in an inverter system.

As depicted generally in FIGURE 1, a three-phase inverter 10 includes individual phase circuits 10A, 10B, and 10C. In its operation inverter 10 is effective upon energization by a suitable D-C energizing potential applied over conductors 11, 12 from a suitable D-C supply circuit 13 to provide an A-C polyphase output voltage over output conductors 14, 15 and 16 to energize load 17. The switching on and off of suitable semiconductor switching means such as SCR's (not shown) within inverter 10 is regulated by gating signals provided by control circuit 18 and applied over conductors 20–25 to the switching components within inverter 10. An energy return circuit 26 is also provided, and conductors 27–29 are connected to pass commutating energy from each of the phases 10A, 10B and 10C to the energy return circuit. In accordance with the present invention, switching means 30, 31 and 32 are included within the energy return circuit and connected to periodically return the commutating energy to the input circuit 11, 12. To simplify the block diagram, it is indicated that the switches 30–32 are gated on and off by control signals received from conductors 20–25. As will become apparent subsequently, a second set of signals electrically isolated but timed in relationship to the control signals applied to inverter phases 10A, 10B and 10C, is utilized to regulate the operation of the switches 30–32. This separation of the control signals will be better understood by considering a single-phase circuit of the inverter together with the application of the respective gating potentials to this circuit and to the associated switching means within the related parts of the energy return circuit.

STRUCTURE OF THE INVENTION

Figure 2:
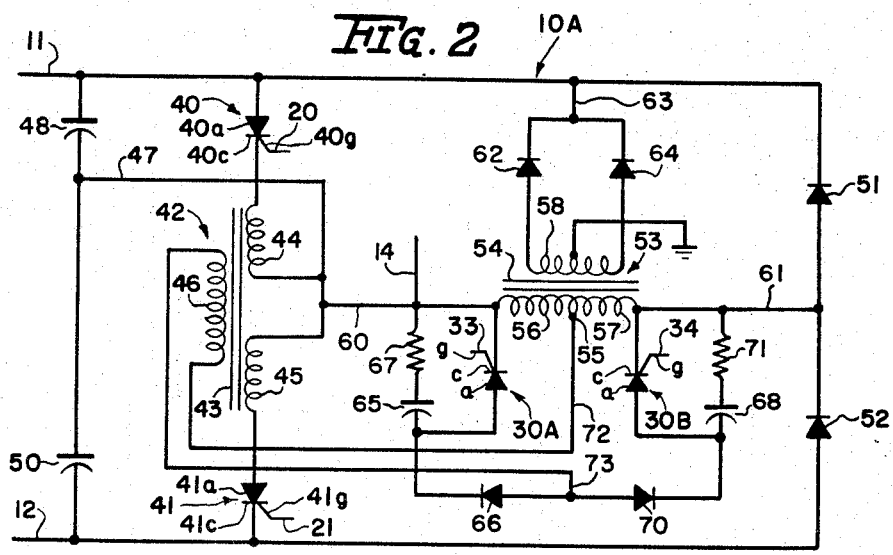
FIGURE 2 is a schematic diagram particularly illustrating a preferred embodiment of the present invention.
Figure 3:
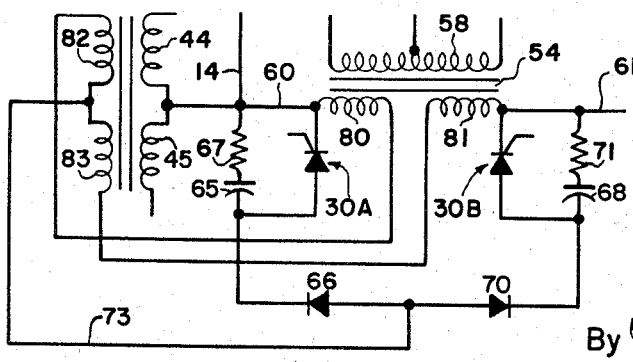
FIGURE 3 is a partial schematic diagram depicting variations of the present invention.

The single phase circuit 10A shown in FIGURE 2 comprises a pair of semiconductor switching means 40 and 41, each having an anode referred by $a$, a cathode referenced by $c$ and a gate or control electrode indicated by $g$. Anode 40$a$ of the upper SCR is coupled to input conductor 11, and cathode 41$c$ of the SCR in the lower sub-assembly is coupled to input conductor 12. A commutating choke assembly 42 is provided with a core 43 on which windings 44, 45 and 46 are wound. In general this core assembly 42 is conventional as respects the position of core 43 and windings 44 and 45. For the moment the winding 46 will be neglected in that it is a portion of the novel and unobvious energy return circuit of the invention.

Cathode 40$c$ of SCR 40 is coupled to the upper portion of winding 44, and anode 41$a$ of the other SCR 41 is coupled to the lower portion of winding 45; these two windings are coupled together electrically at a common point, and over conductor 47 to the common junction formed by the commutating capacitors 48 and 50 coupled in series across the input conductors 11 and 12. Load conductor 14 is also coupled to the common electrical connection between windings 44 and 45. These components, together with spillover diodes 51 and 52 coupled in series and between conductors 11 and 12 as indicated, comprise the usual components of a single-phase inverter arrangement.

The energy return circuit includes a spillover or energy return transformer 53 having a core 54, a primary winding effectively divided by a center tap connection 55 to include portions 56 and 57, and a center-tapped secondary winding 58, the center-tapped connection of which is coupled to a plane of reference potential conventionally designated as ground. One end portion of primary section 56 is coupled to conductor 60, at a common point including the connections to windings 44 and 45 of the commutating choke assembly, and to output conductor 14. One end portion of primary section 57 is coupled to a common conductor 61, shown connected to the anode of diode 51 and the cathode of diode 52. One end of secondary winding 58 is coupled through a diode 62 to a common line 63, in its turn coupled to input conductor 11, and the other end of secondary winding 58 is coupled through a diode 64 to the same common conductor 63. The described portion of the energy return arrangement is known and functions when the commutating energy from capacitor 48 or 50 has been dumped into the choke assembly and this energy commences to be returned around a circuit including primary winding portions 56, 57, diode 51 or 52 and SCR 40 or 41 to return the circulating energy over transformer 53 and diode 62 or 64 to the input circuit.

In accordance with the present invention, a second semiconductor switching means is provided. In the illustrated embodiment such means includes SCR's 30A and 30B, coupled to the opposite ends of the primary winding of transformer 53. Each of these SCR's includes an anode, a cathode, and a gate element designated in a manner similar to that of SCR's 40 and 41. The cathode of SCR 30A is coupled to one end of primary portion 56 and the gate of the same SCR is coupled to control conductor 33. The anode of SCR 30A is coupled to the common connection between capacitor 65 and diode 66; the other plate of capacitor 65 is coupled over a resistor 67 to conductor 60.

The cathode of SCR 30B is coupled to one end of primary section 57 and the gate or control element of that same SCR is coupled to control conductor 34. The anode of SCR 30B is coupled to the common connection between a capacitor 68 and the cathode of diode 70; the other plate of capacitor 68 is coupled, through resistor 71, to conductor 61. Lastly, the center-tap connection 55 of primary winding 56, 57 is coupled over conductor 72 to one end of winding 46 of the commutating choke assembly, and the other end of winding 46 is coupled over conductor 73 to the common connection between the anodes of diodes 66 and 70.

OPERATION OF THE INVENTION

The explanation of the commutation and energy retrieval means will be set out under no-load conditions to simplify the discussion. Operation under load will be apparent to those skilled in the art.

It is initially assumed that a suitable unidirectional potential difference is applied between conductors 11 and 12, that appropriate gating or control potentials are sequentially applied to control conductors 20, 21, 33 and 34, and that load conductor 14 is coupled to the appropriate portion of the three-phase load. Those skilled in the art will also recognize that, if desired, the inverter arrangement of FIGURE 2 can be utilized as a single-phase arrangement.

It is assumed that the circuit 10A is in the stable portion of the operating cycle in that SCR 41 is in what would be a conducting state under loaded conditions and that SCR 40 is the non-conductive state. Accordingly, in that an open circuit is across capacitor 48, this capacitor is charged to approximately the potential difference appearing between conductors 11 and 12. At this time a suitable gating potential is applied over conductor 20 to gate 40$g$ of SCR 40 and substantially simultaneously a similar control potential is independently applied over conductor 33 to gate or SCR 30A of the energy return arrangement.

As soon as SCR 40 is rendered conductive, capacitor 48 rapidly discharges over conductor 11, SCR 40, winding 44, and conductor 47 back to the other plate of this capacitor. Simultaneously, capacitor 50 charges over conductor 11, SCR 40, winding 44 and capacitor 50 to conductor 12. This transient current effects a rapidly increasing level of current flow through winding 44 until the current level reaches a maximum, and at this instant a maximum of energy is stored in the commutating choke assembly 42. It is noted that SCR 30A was gated on concomitantly with the application of the turn-on potential to SCR 40. As the current level passing through winding 44 of the commutating choke assembly reaches a maximum value and begins to decrease, the polarities of the voltages appearing across windings 44 and 46 reverse.

As the reversed voltage across winding 46 increases in magnitude, the voltage across primary section 56 also increases, as does the level of the voltage across secondary winding 58. At a voltage level preset by the turns ratio between windings 56 and 58, diode 62 conducts, clamping the voltages across windings 58, 56 and across windings 46, 44, and 45. The turns ratio between windings 44 and 46, and the turns ratio between windings 56 and 58, are chosen so that the total voltage clamped across windings 56 and 57 is greater than the voltage clamped across winding 44. In this manner, current is blocked from flowing through SCR 40 and diode 51. The energy trapped in the choke assembly then returns via transformer 53 as current flows from the top of winding 46 through conductor 73, diode 66, SCR 30A, portion 56 of the primary winding of transformer 53, terminal 55 of this transformer, and conductor 72 to the lower end of winding 46. Under loaded conditions reactive current may pass through windings 56, 57 and diode 51 simultaneously with the just-described energy return over transformer 53.

Thus the commutating energy stored in the commutating choke assembly as capacitor 48 discharges and passes its previously-stored energy into winding 44 is taken out of the commutating choke assembly and returned over transformer 53 to the input circuit of the inverter without passing through SCR 40. This is a most important consideration because, without any heating of SCR's 40 and 41 caused by the return of the commutating energy to the inverter circuit, a much greater portion of the thermal rating of SCR's 40 and 41 (and the SCR's in the other phase circuits of the inverter) can be utilized in the normal handling of the load current.

Responsive to the next operation occasioned by receipt of suitable gating signals over conductor 21 to switch on SCR 41 and over conductor 34 to switch on SCR 30B, capacitor 50 rapidly discharges through winding 45 and SCR 41 while capacitor 48 charges through winding 45 and SCR 41, effecting the storage of energy in commutating choke assembly 42 in a manner evident from the preceding description. This energy is then returned over a circuit extending from the top portion of winding 46 over conductor 73, diode 70, SCR 30B, portion 57 of the primary winding of transformer 53, mid-point 55 of this winding, and conductor 72 to the lower connection of winding 46. Operation responsive to receipt of subsequent control or gating pulses will be evident to those skilled in the art.

The diodes 66 and 70 are provided to protect the energy circuit including SCR's 30A and 30B against the normal commutation "spike" or high transient voltage which appears across winding 46 of commutating choke assembly 42 during the commutation time interval. By thus protecting the SCR's in the energy return circuit, the requisite voltage rating for these SCR's is kept low and thus the expense required is likewise minimized. While a single diode in series with winding 46 (in place of diodes 66, 70) may function equally well under some conditions, the recovery time of present commercial diodes is such that the preferred embodiment utilizes two diodes in the circuit depicted in FIGURE 2. Additional protection for each of the SCR's 30A, 30B is afforded by the series circuits including the resistor and capacitor coupled in parallel with each of these SCR's.

Those skilled in the art will further appreciate that a physically large transformer is not required for energy feedback transformer 53, in that the energy return thereover is accomplished during a very short time period immediately after the commutation between conduction of the two main SCR's 40 and 41. Thus the volt-time integral for this transformer is quite small, and should the transformer saturate after the energy return period, it does not in any way affect the effective operation of the circuit.

Various modifications of the circuit shown in FIGURE 2 are possible, such as providing separate primary windings 80 and 81 for the energy return transformer which passes the returned commutating energy back to the input circuit. In a related manner the commutating choke assembly may comprise a pair of windings 82, 83 having the opposed end portions coupled to the respective end portions of primary windings 80, 81 as shown and the common portion coupled to the junction of diodes 66, 70. The secondary winding 58 may be incorporated into transformer 53 as an autotransformer in a manner evident to workers skilled in this art. Other modifications will no doubt be suggested to those skilled in the art.

SUMMARY

The invention provides for a rapid return of the commutating energy in an inverter circuit back to the input circuit without passing through the semiconductor switch just gated in, thus minimizing the heating of such switching components heretofore caused by return of the commutating energy. With this invention the maximum thermal rating of the SCR can be allocated to the heating created by passage of load current through the SCR, thus up-rating the capacity of the inverter in which the novel and unobvious circuit is used. By gating the secondary SCR's in the energy return circuit substantially simultaneously with the primary switching components which handle the load currents, the energy feed-back path is completed at the proper time periods to insure that the commutating energy is rapidly passed back to the input circuit.

Although only particular embodiments of the invention have been described and illustrated, it is apparent that modifications and alterations may be made therein. It is therefore the intention in the appended claims to cover all such modifications and alterations as may fall within the true spirit and scope of the invention.

The embodiments of the invention in which an exclusive property or privilege is claimed are defined as follows:

1. In an inverter system having semiconductor switching means operable between first and second conditions for converting unidirectional energy received over an input circuit to alternating energy for transfer over an output circuit, means for applying control signals to said semiconductor switching means to initiate operation from one to another of said conditions, auxiliary means in which commutating energy is cyclically trapped during operation of the semiconductor switching means between said conditions, the energy thus trapped tending to be dissipated by circulation through at least a portion of the system, and energy return means for recovering substantially all the trapped energy from said auxiliary means, the improvement which comprises switch means coupled in said energy return means, and means for actuating said switch means in timed relation with the application of said control signals to said semiconductor switching means, to obviate excessive component heating by returning the energy trapped in said auxiliary means to the input circuit without passing through said semiconductor switching means.

2. In an inverter system having first semiconductor switching means operable between first and second conditions for converting unidirectional energy received over an input circuit to alternating energy for transfer over an output circuit, means for applying first control signals to said first semiconductor switching means to initiate operation from one to another of said conditions, a commutating choke assembly in which energy is cyclically trapped during system operation as the first semiconductor switching means is operated between said conditions, the energy thus trapped tending to be dissipated by circulation through at least a portion of the system, and an energy return circuit for recovering substantially all the energy trapped in said commutating choke assembly, the improvement which comprises second semiconductor switching means coupled in said energy return circuit, and means for applying second control signals to said second semiconductor switching means in timed relation with the application of said first control signals to said first semiconductor switching means, to obviate excessive component heating by returning the energy trapped in said commutating choke assembly to the input circuit without passing through said first semiconductor switching means.

3. In an inverter having at least a first semiconductor switch operable to convert D-C energy received over an input circuit to A-C energy for transfer over an output circuit, means for applying first gating signals to said semiconductor switch to gate the switch on, a commutating choke assembly for cyclically storing energy and returning the stored energy to the inverter to assist in shut-off of the semiconductor switch, the energy thus returned tending to be dissipated by circulation through at least a portion of the inverter, and an energy return circuit for recovering substantially all the stored energy returned from the commutating choke assembly, the improvement which comprises at least a second semiconductor switch coupled in said energy return circuit, and means for applying second gating signals to said second semiconductor switch in timed relation with the application of the first gating signals to said first semiconductor switch, to obviate excessive component heating by returning the energy from the commutating choke assembly directly to the input circuit without passing through the first semiconductor switch.

4. In an inverter having first and second semiconductor switches coupled to an input circuit for receiving D-C energy and operable to provide A-C energy for transfer over an output circuit, means for applying a first set of gating signals to the first and second semiconductor switches, a commutating choke assembly including core means and a pair of windings coupled to said semiconductor switches for cyclically receiving commutating energy to assist in shut-off of the semiconductor switches, the commutating energy being trapped in the choke assembly and tending to be dissipated by circulation through at least a portion of the inverter, and an energy return circuit comprising an energy return transformer including a primary portion coupled to said commutating choke assembly and a secondary portion coupled to said input circuit, the improvement which comprises switch means in said energy return circuit coupled to the primary portion of the energy return transformer, an additional winding magnetically coupled to the core means in said commutating choke assembly and electrically coupled to said switch means, and means for applying a second set of gating signals to said switch means in timed relation with the application of the first gating signals to the first and second semiconductor switches, thereby to actuate the switch means and provide for return of the energy trapped in the commutating choke assembly through the switch means and over the energy return transformer to the input circuit without passing through the first and second semiconductor switches and obviating unnecessary heating of these switches.

5. In an inverter circuit which includes an input circuit having a pair of input conductors for receiving D-C energy thereover, a first pair of semiconductor switches respectively coupled to said input conductors, a commutating choke assembly including a core and a pair of windings magnetically coupled to said core and electrically coupled between said semiconductor switches for assisting in shut-off of one of said switches after the other is gated on, means for applying a first set of gating signals to said semiconductor switches, means for passing commutating energy into one of said commutating choke windings as said other semiconductor switch is turned on to assist in shut-off of said one switch, which commutating energy is trapped in the choke assembly and tends to be returned by recirculation through said other semiconductor switch, and an energy return circuit including an energy return transformer having a primary portion coupled to said choke windings and a secondary portion coupled to said input circuit, the improvement which comprises a second pair of semiconductor switches respectively coupled to opposite ends of said primary portion, a third choke winding magnetically coupled with said core of the commutating choke assembly, means for coupling one end of said third choke winding to an intermediate point on the primary portion of the energy return transformer and unidirectional current conduction means for coupling the other end of said third choke winding to said second pair of semiconductor switches, and means for applying a second set of gating signals to said second pair of semiconductor switches substantially in time coincidence with the application of the first set of gating signals to said first pair of semiconductor switches, whereby the energy trapped in the commutating choke assembly is returned over the conducting one of the second pair of semiconductor switches and said energy return transformer to the input circuit to obviate heating of the first pair of semiconductor switches which would otherwise be caused by return of the trapped commutating energy.

6. In an inverter circuit:
an input circuit including a pair of input conductors for receiving a D-C potential;
first and second semiconductor switches, each having anode, cathode, and gate elements;
means for coupling the anode of the first semiconductor switch to one of said input conductors and for coupling the cathode of the other switch to the other input conductor;
a commutating choke assembly, including first and second windings electrically coupled in series with each other at a first common point, a third winding, and a core magnetically intercoupling all three of said windings;
means for coupling one end of the first choke winding to the cathode of the first semiconductor switch and for coupling one end of the second choke winding to the anode of the second semiconductor switch;
an output conductor coupled to the first common point;
a pair of spillover diodes coupled to each other at a second common point and coupled in series between said first and second input conductors;
an energy return transformer including primary and secondary windings;
means for coupling one end of said primary winding to the first common point and for coupling the other end of said primary winding to the second common point;
means including first unidirectional current conduction means intercoupling said secondary winding and said input circuit;
third and fourth semiconductor switches, each having anode, cathode and gate elements;
means for coupling the cathode of the third semiconductor switch to one end of the primary winding of the energy return transformer and means for coupling the cathode of the fourth semiconductor switch to the other end of said primary winding;
means for coupling one end of the third commutating choke winding to the mid-point of the primary winding of the energy return transformer and means, including second unidirectional current conduction means, for coupling the other end of the third choke winding to the anodes of the third and fourth semiconductor switches; and
means for applying gating signals to the gates of the semiconductor switches to effect sequential operation of said switches and the return of the commutating energy over said third commutating choke winding, the energy return transformer and the first unidirectional current conduction means to the input circuit without passing through either of the first and second semiconductor switches.

7. An inverter circuit as claimed in claim 6 in which the primary winding of the energy return transformer is two separate primary windings.

8. An inverter circuit as claimed in claim 6 in which said third commutating choke winding is electrically divided into two separate choke windings for separate return of the commutating energy through the respective third and fourth semiconductor switches.

References Cited

UNITED STATES PATENTS

| | | | |
|---|---|---|---|
| 3,131,345 | 4/1964 | Reinert | 321—16 |
| 3,250,978 | 5/1966 | Moscari | 318—345 |
| 3,303,406 | 2/1967 | Bedford | 321—44 |
| 3,308,371 | 3/1967 | Studtmann | 321—45 |
| 3,311,809 | 3/1967 | Corey et al. | 321—45 |
| 3,313,998 | 4/1967 | Bunker | 321—18 X |

JOHN F. COUCH, *Primary Examiner.*

WM. SHOOP, *Assistant Examiner.*